(12) United States Patent
Smith et al.

(10) Patent No.: US 6,230,775 B1
(45) Date of Patent: May 15, 2001

(54) HIGH TEMPERATURE WET FILAMENT WINDING ARRANGEMENT

(75) Inventors: Mitchell D. Smith, New London; Pieter James Van Dine, Mystic, both of CT (US)

(73) Assignee: Electric Boat Corporation

( * ) Notice: Subject to any disclaimer, the term of this patent is extended or adjusted under 35 U.S.C. 154(b) by 0 days.

(21) Appl. No.: 09/234,573

(22) Filed: Jan. 21, 1999

(51) Int. Cl.[7] ................................................. B65H 81/00
(52) U.S. Cl. ........................ 156/425; 156/433; 156/443; 156/446
(58) Field of Search .................................. 156/169, 173, 156/175, 425, 433, 441, 443, 446

(56) References Cited

U.S. PATENT DOCUMENTS

| | | | |
|---|---|---|---|
| Re. 30,770 | * | 10/1981 | Shobert et al. . |
| 3,627,601 | | 12/1971 | Hayes et al. . |
| 4,078,957 | * | 3/1978 | Bradt ................................ 156/173 |
| 4,154,634 | * | 5/1979 | Shobert et al. . |
| 4,168,194 | * | 9/1979 | Stiles . |
| 4,285,749 | * | 8/1981 | Stiles . |
| 4,975,232 | * | 12/1990 | Hattori et al. . |
| 5,096,645 | * | 3/1992 | Fink . |
| 5,098,496 | * | 3/1992 | Breitigam et al. . |
| 5,160,561 | * | 11/1992 | Gruber ............................. 156/175 |
| 5,425,829 | * | 6/1995 | Chang . |
| 5,529,652 | * | 6/1996 | Asai et al. . |

FOREIGN PATENT DOCUMENTS

| | | | |
|---|---|---|---|
| 320653 | * | 6/1989 | (EP) . |
| 0463611 | | 1/1992 | (EP) . |
| 9912716 | | 3/1999 | (GB) . |
| 59-185626 | * | 10/1984 | (JP) . |
| 4-101831 | * | 4/1992 | (JP) . |
| 5-329944 | * | 12/1993 | (JP) . |
| 508393 | | 10/1998 | (SE) . |

OTHER PUBLICATIONS

Rosato, D.V., et al., Filament Winding :its development, manufacture, applications, and design, 1964, pp. 102–109.*
Abstract of Japanese Patent 2–220,828 published Apr.9–1990.

* cited by examiner

Primary Examiner—Jeff H Aftergut
(74) Attorney, Agent, or Firm—Baker Botts L.L.P.

(57) ABSTRACT

In the embodiment described in the specification, a high temperature wet filament winding arrangement has a wet bath containing a resin at a temperature above 500° F. and filaments drawn from a spool rack are passed through the wet bath and then through a heated comb which maintains the temperature of the filaments above 500° F., after which the filaments are passed through a heated passage controlled to maintain the temperature above 500° F. A winding eye, also heated to maintain the filament temperature above 500° F., directs the heated fibers onto a mandrel where they are wound in uniform layers into the form of a final product. A mandrel heater heats the mandrel to which the fibers are being applied so as to maintain a uniform temperature above 500° F.

3 Claims, 2 Drawing Sheets

HIGH TEMPERATURE WET FILAMENT WINDING ARRANGEMENT

BACKGROUND OF THE INVENTION

This invention relates to wet filament winding arrangements for manufacturing composite products.

The wet filament winding process is a process in which a reinforcing fiber for a manufactured product is wetted with a molten or a liquid resin by passing the fiber through a liquid resin bath and then delivering it to a rotating mandrel in the wetted state. The wetted fiber is then placed precisely on and held in intimate contact with previously delivered wetted fibers so that when the winding process is complete the part has a very precisely controlled fiber arrangement and uniform fiber-to-resin ratio, producing a part that is constant in composition throughout its volume. The wet resin is then solidified in the manner required by the particular resin, i.e. by cooling a resin that is thermoplastic below its solidification temperature or by setting a settable resin using pressure, heat, ultraviolet light, or a curing agent, if necessary.

Wet filament winding processes have been used to fabricate composite tubing, pressure vessels, and parts having varying cross-sectional areas as well as similar structures and, for specific structural arrangements, wet filament winding can accommodate the insertion of other materials in particular regions of the part such as the ends or intermediate sections. Conventional wet filament winding processes, however, have not been capable of using resins that require temperatures of at least 500° F. to be maintained throughout the entire wet stage of the fabrication process because the resin cools quickly after leaving the liquid resin bath.

Processes for coating fibers with liquid or molten resin to provide a resin reinforced fiber structure which is formed into a continuous fiber reinforced structure having a desired cross-sectional configuration are disclosed in U.S Pat. Nos. 4,168,194, 4,154,634, Re 30,770 and 4,285,749. The arrangements described in those patents, however, would not permit precise placement of wetted fiber on a mandrel as is required for wet filament winding. U.S. Pat. No. 5,529,652 discloses the manufacture of fiber reinforced thermoplastic "pre-pregs" consisting of fibers which have been preimpregnated with resins and then solidified so that the product can be stored for later use in the manufacture of end products. U.S. Pat. No. 5,096,645 describes the fabrication of extruded thermoplastic members that are reinforced by longitudinally extending prestressed elements which are fiber reinforced thermosetting resins that are partially cured in cylindrical dies. The prestressed elements are put in tension and encased in thermoplastic by an extrusion process to produce a solid final product.

U.S. Pat. No. 5,098,496 describes a process for making a postformable composite article containing a heat curable thermosetting polymer by introducing reinforcing fibers continuously into a heat hardenable thermosetting resin and then pulling the polymer composition fiber mixture continuously through a die having a desired shape to form the composite into a continuous product of desired cross-sectional configuration by controlling the pull rate and the die temperature. The polymer composition-fiber mixture is maintained in a gel state so that the formed article can then be cured in a different shape. U.S. Pat. No. 5,425,829 discloses a conventional wet filament winding process for forming composite leaf springs containing glass fibers with a reduced spring rate and uniform stress by replacing a proportion of the glass fibers with plastic fibers. U.S. Pat. No. 4,975,232 describes a process for manufacturing fiber-reinforced linear plastic material formed with a twisted groove on the outer surface to allow for accommodation of an optical fiber by heating a fully cured resin above its glass transition temperature and then inducing a twisted groove.

SUMMARY OF THE INVENTION

Accordingly, it is an object of the present invention to provide a high temperature wet filament winding arrangement for manufacture of composite products which overcomes disadvantages of the prior art.

Another object of the invention is to provide a high temperature wet filament winding arrangement for manufacturing composite products which assures uniform resin/filament ratios throughout the volume of the product.

These and other objects and advantages of the invention are attained by providing high temperature wet filament winding arrangements including a high temperature wet bath in which a resin is maintained at a temperature above 500° F. and a high temperature fiber delivery system in which a fiber tow which has been passed through the wet bath and coated with wet resin is maintained continuously at a temperature above 500° F., along with a mandrel on which the wetted fiber is wound and a heated fiber placement eye also maintained at a temperature above 500° F. so as to assure that the wetted fiber is at a temperature exceeding 500° F. when it is wound on the mandrel. Preferably the mandrel has a preheater that provides independent control and focuses heat to an area on the mandrel at which the wetted tow band is to be placed by the heated placement eye.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
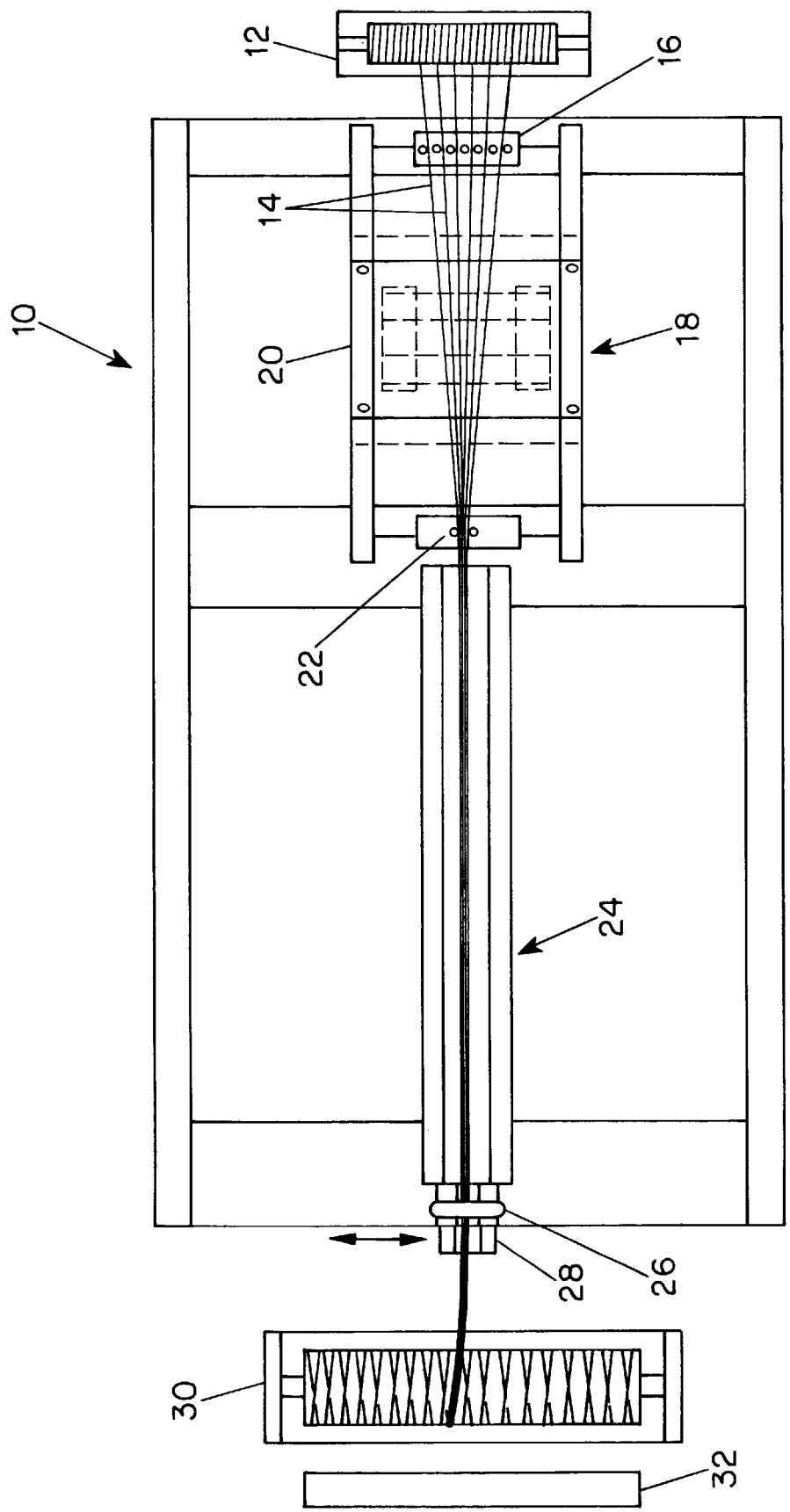
FIG. 1 is a schematic plan view illustrating a representative embodiment of a high temperature wet filament winding arrangement for a composite part manufactured in accordance with the invention.
Figure 2:
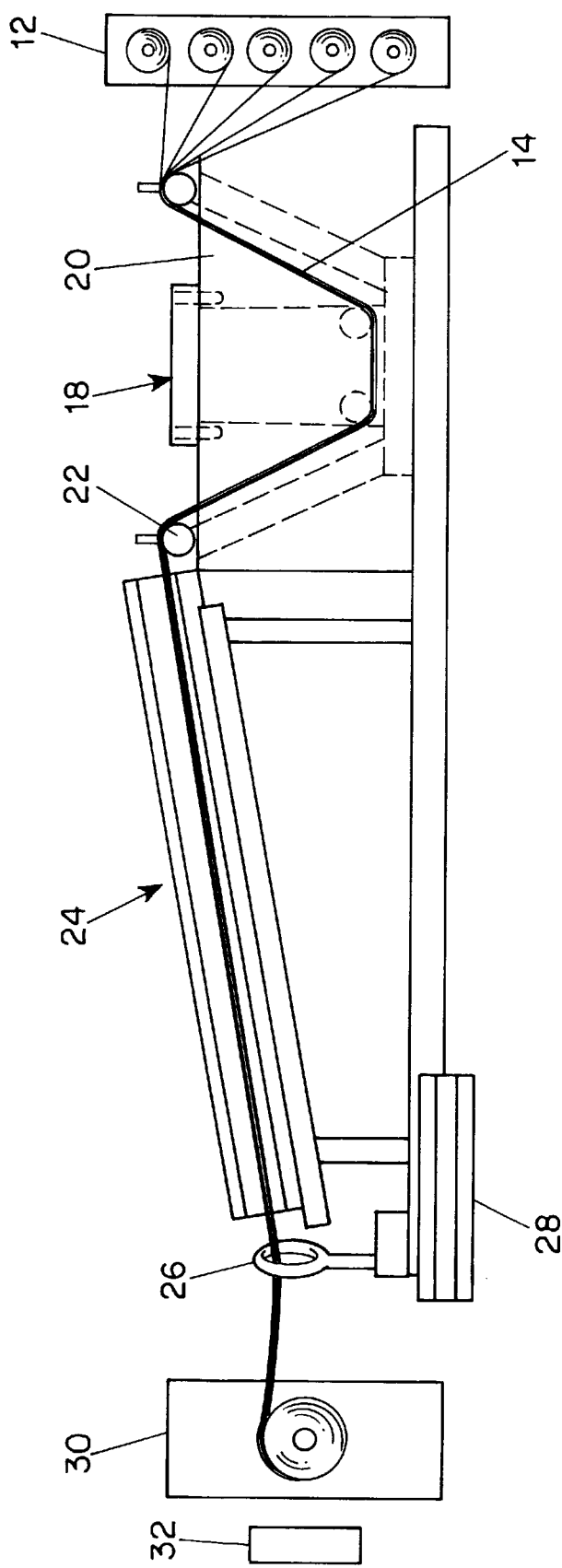
FIG. 2 is a side view of the arrangement shown in FIG. 1.

In the typical embodiment of the invention illustrated in the drawings, a wet filament winding system 10 has a stack of fiber spools 12 from which fibers 14 are pulled through a comb 16 and directed through a fiber impregnation assembly 18 which draws the fibers downwardly into a high temperature wet bath 20 in which the fibers are coated and impregnated with a resin maintained at a high temperature above 500° F. The fibers are then drawn through a heated outlet comb 22 with an independent temperature control, assuring maintenance of above 500° F., and are then passed through a heated enclosure 24 which also has an independent temperature control and maintains the temperature of the resin coated on the fibers at a level above 500° F.

From the heated enclosure 24, the fibers are passed in the form of a band through a heated placement eye 26 which also has an individually controlled heater 28 to maintain the temperature of the wetted tow band above 500° F. as it passes to a mandrel 30 on which it is wound by oscillating motion of the placement eye 26 as the mandrel rotates so as to provide uniform layers of filament on the mandrel. A separate heating arrangement 32 is provided to heat the mandrel assuring placement of the tow band on a heated region so that the temperature of the adjacent portion of the fibers previously wound on the mandrel is maintained at a temperature of at least 500° F.

The resin in the high temperature wet bath 20 may be any resin, whether thermoplastic or otherwise, which can be maintained at a temperature above 500° F. without degradation and which can be cured or solidified conveniently either by cooling or by curing with pressure, heat, ultraviolet light or the like. By maintaining the entire wet filament winding system from the wet bath 20 to the mandrel 30 at a temperature above 500° F., it has been found that the uniformity of coating of the fibers and resin on a mandrel is substantially improved compared with conventional wet filament winding systems for composite manufacture. In such conventional systems, partial solidification of the filaments previously wound on the mandrel is interrupted by application of an overlying wet filament at a higher temperature, producing irregularities in the final product. Moreover, solidification of the resin on the filament can occur prior to winding on the mandrel, likewise producing irregularities in the finished product and possible gaps in the resin layers provided by the winding. Moreover, if a resin has partially solidified or cured before winding, it is subject to settling in the product after winding, resulting in deformation of the product. This is avoided in accordance with the invention by maintaining the wet filaments at a temperature in excess of 500° F. both prior to and during the winding of the mandrel until the winding has been completed and then solidifying the resin uniformly on the mandrel.

Although the invention has been described herein with reference to specific embodiments, many modifications and variations therein would readily occur to those skilled in the art. Accordingly, all such variations and modifications are included within the intended scope of the invention.

We claim:

1. A high temperature wet filament winding arrangement comprising a filament supply for supplying one or more filaments to be wetted and wound on a mandrel to provide a composite product, a high temperature wet bath comprising a resin maintained at a temperature above about 500° F., a guide arrangement for guiding filaments from the filament supply through the wet bath and producing wetted filaments, a heated enclosure for conveying wetted filaments from the wet bath while maintaining the temperature of the filaments above about 500° F., a mandrel for winding the wetted filament into a predetermined shape, a heated winding eye for guiding wetted filament from the heated filament path onto the surface of the mandrel in uniform layers and heating means for heating at least the portion of the mandrel to which the wetted filaments are supplied by the winding eye, whereby the wetted filaments are maintained at a temperature above about 500° F. throughout their entire passage from the high temperature wet bath to the mandrel surface to provide improved uniformity of coating of the fibers and resin on the mandrel.

2. A high temperature wet filament winding arrangement according to claim 1 including a heater for the winding eye to maintain the temperature of the wetted fiber passing through the winding eye at above about 500° F.

3. A high temperature wet filament winding arrangement according to claim 1 including a heated comb for guiding wetted fibers from the wet bath to the heated passage and maintaining the temperature of the fibers above about 500° F.

* * * * *